US006334109B1

(12) United States Patent
Kanevsky et al.

(10) Patent No.: US 6,334,109 B1
(45) Date of Patent: Dec. 25, 2001

(54) DISTRIBUTED PERSONALIZED ADVERTISEMENT SYSTEM AND METHOD

(75) Inventors: Dimitri Kanevsky, Ossining; Alexander Zlatsin, Yorktown Heights, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/183,402

(22) Filed: Oct. 30, 1998

(51) Int. Cl.[7] ................................................ G06F 17/60
(52) U.S. Cl. .............................. 705/14; 395/214; 705/26
(58) Field of Search .................................................. 705/14

(56) References Cited

U.S. PATENT DOCUMENTS

| | | | |
|---|---|---|---|
| 4,908,761 | * 3/1990 | Tai | 364/401 |
| 5,249,044 | * 9/1993 | Von Kohorn | 358/86 |
| 5,644,723 | * 7/1997 | Deaton | 395/214 |
| 5,745,882 | * 4/1998 | Bixler | 705/26 |
| 5,781,894 | * 7/1998 | Petrecca | 705/14 |
| 5,809,481 | * 9/1998 | Baron | 705/14 |
| 5,873,068 | * 2/1999 | Beaumont | 705/14 |
| 5,909,670 | * 6/1999 | Trader | 705/14 |
| 5,914,670 | * 6/1999 | Goodwin | 705/14 |
| 5,918,211 | * 6/1999 | Sloane | 705/16 |
| 5,933,811 | * 8/1999 | Angles | 705/14 |
| 5,937,390 | * 8/1999 | Hyodo | 705/14 |
| 5,943,654 | * 8/1999 | Goodwin | 705/14 |
| 5,999,912 | * 12/1999 | Wodarz | 705/14 |
| 6,026,369 | * 2/2000 | Capek | 705/14 |

FOREIGN PATENT DOCUMENTS

| | | | | |
|---|---|---|---|---|
| 1035527 | * | 3/2000 | (EP) | G07G/1/12 |
| 99/11021 | * | 3/1999 | (WO) | H04L/9/00 |

OTHER PUBLICATIONS

"Coupon Clippers–Savbe Your Scissors"—Business Week Jun. 20, 1994—p. 164 No. 3377.*
"Engage Technologies and Open market Team Up"—Business Wire—Jul. 20, 1998 8:9.*

* cited by examiner

Primary Examiner—Robert P. Olszewski
Assistant Examiner—Geoffrey Akers
(74) Attorney, Agent, or Firm—Ohlandt, Greeley, Ruggiero & Perle, LLP; Daniel P. Morris, Esq.

(57) ABSTRACT

A system and method is disclosed for producing an advertisement that is personalized to a particular user for a current transaction and is presented to such user at the point of sale or transaction terminal. The transaction terminal produces current transaction data that includes customer identity, and goods/services being purchased and their prices. the current transaction data is sent to an advertisement server via a network such as the Internet. The advertisement server uses a user database, a goods database and an advertisement database to locate an existing advertisement or create a new advertisement that is personalized to the particular user. The personalized advertisement is sent to the transaction terminal for presentation to the user by displaying or printing on a sales receipt.

35 Claims, 5 Drawing Sheets

DISTRIBUTED PERSONALIZED ADVERTISEMENT SYSTEM AND METHOD

FIELD OF INVENTION

This invention relates to a system, a method and a memory media for providing a personalized advertisement over a communication network through various embedded devices and computer systems. More particularly, the invention provides an advertisement that is personalized to a particular user for a current transaction. The personalized advertisement may be communicated to the particular user by using printers or displays associated with the transaction terminal that generates the current transaction.

BACKGROUND OF THE INVENTION

Advertisements bring people's attention to available goods and/or services. Advertisements are usually provided via television (TV), newspapers, junk mail and similar media. The problem with these kinds of advertisements is that they do not distinguish different users according to their tastes, interests, hobbies. Some advertisements are specific for some classes of users (for example, children, adults, men, women and other classes).

Class specific advertisements are still too broad to take into account characteristics specific to a particular user. Class specific advertisements are sometimes displayed in places where there are no users who are members of the class.

There exists a category of advertisements that are printed on back sides of receipts that are produced by cash registers. These advertisements are intended for a general audience of customers without taking into account special customer characteristics.

Another problem is that it is difficult to gather information about specific customer needs. Advertising agencies try to gather such information via polls that are expensive and cover only a small number of potential users.

An object of the present invention is to provide a system, method, and memory media for providing a personalized advertisement to a particular user via a communication network for displaying or printing by devices that are associated with a transaction terminal.

Another object of the present invention is to provide a system and method for detecting a customer and using this identity for gathering information about customer characteristics.

Yet another object of the present invention is to provide a system and method for using biometrics to find a user identity in order to provide him/her with a personalized advertisement.

Yet another object of the present invention is to provide a system and method for using devices with displays for distributing personalized advertisements.

SUMMARY OF THE INVENTION

In accordance with the present invention an advertisement that is personalized to a particular user for a current transaction from a transaction terminal is provided by a system that includes a processor, an operating memory, one or more input/output (I/O) devices and a database containing data concerning a plurality of (a) users, (b) goods or services and (c) advertisements for various ones or categories of said goods or services. The I/O devices are operable to receive data concerning a current transaction. A personalized advertisement procedure is stored in the operating memory and is operative to configure the processor to (a) process the current transaction data, (b) alter the user data in the database in accordance with the current transaction data, and (c) generate an advertisement, personalized to the particular user and (d) operate the I/O devices to communicate the personalized advertisement to the particular user.

The invention takes advantage of various display and/or printing devices associated with a transaction terminal to communicate a personalized advertisement to a particular user. The user may be a customer who is purchasing certain goods/services or a user who is inquiring about certain goods/services. The transaction terminal may be operated by the user or by a point of sales person. The personalized advertisement is advantageously printed on unused parts of a document produced by the transaction terminal, for example a sales receipt.

The user data stored in the database contains a history of goods/services transactions completed for each user of a plurality of users. The current transaction data is processed by classification as to categories of goods/services to produce classification data and by relation to prior transactions by the particular user to produce relation data. The user data stored in the database is altered by the classification and relation data.

The personalized advertisement is generated based on the current transaction or the prior transactions by either selecting an advertisement from the advertisements contained in the database or by creating a new advertisement. The current transaction data includes, for the particular user, an identity, goods/services and prices chosen by the particular user.

The classification is according to criteria selected from the group that includes age, gender, area of residence, citizenship and physical characteristics of the particular user and type and price of goods/services involved in the current transaction. The relation data is according to a relation between classes of customers and categories of goods/services.

The type and/or format of the personalized advertisement may be qualified by type and/or format data contained in the current transaction data.

The customer identity may include one or more identifying characteristics selected from the group that includes name, gender, age, physical appearance, and biometrics.

Another embodiment of the system according to the present invention obtains from an advertisement server an advertisement that is personalized to a particular user for a current transaction. The system includes a processor, an operating memory and one or more I/O devices. The I/O devices receive data concerning the current transaction for the particular user. The system includes a personalized advertisement procedure stored in the operating memory and operative to configure the processor to (a) extract from the current transaction data an advertising request data that includes the identity of the particular user, the goods/services and prices chosen by the particular user and (b) operate the I/O devices to communicate the advertisement request data to the advertisement server.

The identity data includes one or more characteristics selected from the group of name, physical characteristics, age, gender, and biometrics. The personalized advertisement procedure distributes the personalized advertisement to the I/O devices for communication to the particular user.

The personalized advertisement is presented to the particular user on a sales receipt or on a display In accordance with one method embodiment of the present invention, an advertisement that is personalized to a particular user for a current transaction, includes the steps of storing in a database data concerning a plurality of (a) users, (b) goods or services and (c) advertisements for various ones or categories of said goods or services;

receiving, via one or more I/O devices, data concerning a current transaction for the particular user;

processing the current transaction data with a processor;

altering the user data in the database with the current transaction data;

generating the advertisement personalized to the particular user; and operating the I/O devices to communicate the personalized advertisement to the particular user.

The processing step classifies the current transaction data as to categories of goods/services to produce classification data and by relation to prior transactions by the particular user to produce relation data. The classification and relation data is used to alter the user data. The personalized advertisement is generated based on the prior transactions or the current transaction by either selecting an advertisement from the advertisements contained in the database or by creating a new advertisement through use of the goods/services data. The current transaction data includes, for the particular user, an identity, goods/services and prices chosen by the particular user and optionally the biometrics of the particular user. The classification is according to criteria selected from the group that includes age, gender, area of residence, citizenship and physical characteristics of the particular user and type and price of goods/services involved in the current transaction. The relation data is according to a relation between classes of customers and categories of goods/services.

Another method embodiment according to the present invention obtains from an advertisement server an advertisement that is personalized to a particular user for a current transaction. The method uses a computer system that includes a processor, an operating memory and one or more I/O devices. The method includes the steps of:

receiving, via the I/O devices, data concerning the current transaction for the particular user;

extracting from the current transaction data an advertisement request data;

operating the I/O devices to send the advertisement request data to the advertisement server and to receive from the advertisement server the personalized advertisement; and operating the I/O devices to communicate the personalized advertisement to the particular user.

The identity data includes one or more characteristics selected from the group of name, physical characteristics, age, gender, and biometrics. The personalized advertisement server distributes the personalized advertisement to the I/O devices for communication to the particular user.

The personalized advertisement is presented to the particular user on a sales receipt or on a display.

A first memory media embodiment in accordance with the present invention is intended for a computer that has a processor, an operating memory and one or more I/O devices. The computer operates with a database memory containing data concerning a plurality of (a) users, (b) goods or services and (c) advertisements for various ones or categories of said goods or services. The memory media has stored thereon a personalized advertiser for configuring the computer to receive, via the I/O devices, data concerning the current transaction for the particular user. The personalized advertiser also configures the computer to process the current transaction data, to alter the user data in the database with the current transaction data, to generate the advertisement personalized to the particular user and to operate the I/O devices to communicate the personalized advertisement to the particular user.

The processing operation classifies the current transaction data as to categories of goods/services to produce classification data and by relation to prior transactions by the particular user to produce relation data. The user data is altered by the classification and relation data. The personalized advertisement is generated based on the prior transactions or the current transaction for the particular user by either selecting an advertisement from the advertisements contained in the database or by creating a new advertisement with use of the goods/services data. The current transaction data includes for the particular user an identity, goods/services and prices chosen by the particular user and optionally biometrics of the particular user.

A second memory media embodiment according to the present invention controls a computer system to obtain from an advertisement server an advertisement that is personalized to a particular user for a current transaction.

The memory media includes:

means for configuring the computer system to receive data concerning the current transaction for the particular user;

means for configuring the computer system to extract from the current transaction data an advertisement request data;

means for configuring the computer system to send the advertisement request data to the advertisement server and to receive from the advertisement server the personalized advertisement; and means for configuring the computer system to communicate the personalized advertisement to the particular user.

The identity data includes one or more characteristics selected from the group of name, physical characteristics, age, gender, and biometrics. The personalized advertisement is distributed for communication to the particular user on a sales receipt or on a display.

BRIEF DESCRIPTION OF DRAWINGS

Other and further objects, advantages and features of the present invention will be understood by reference to the following specification in conjunction with the accompanying drawings, in which like reference characters denote like elements of structure and.

DESCRIPTION OF PREFERRED EMBODIMENT

Figure 1:
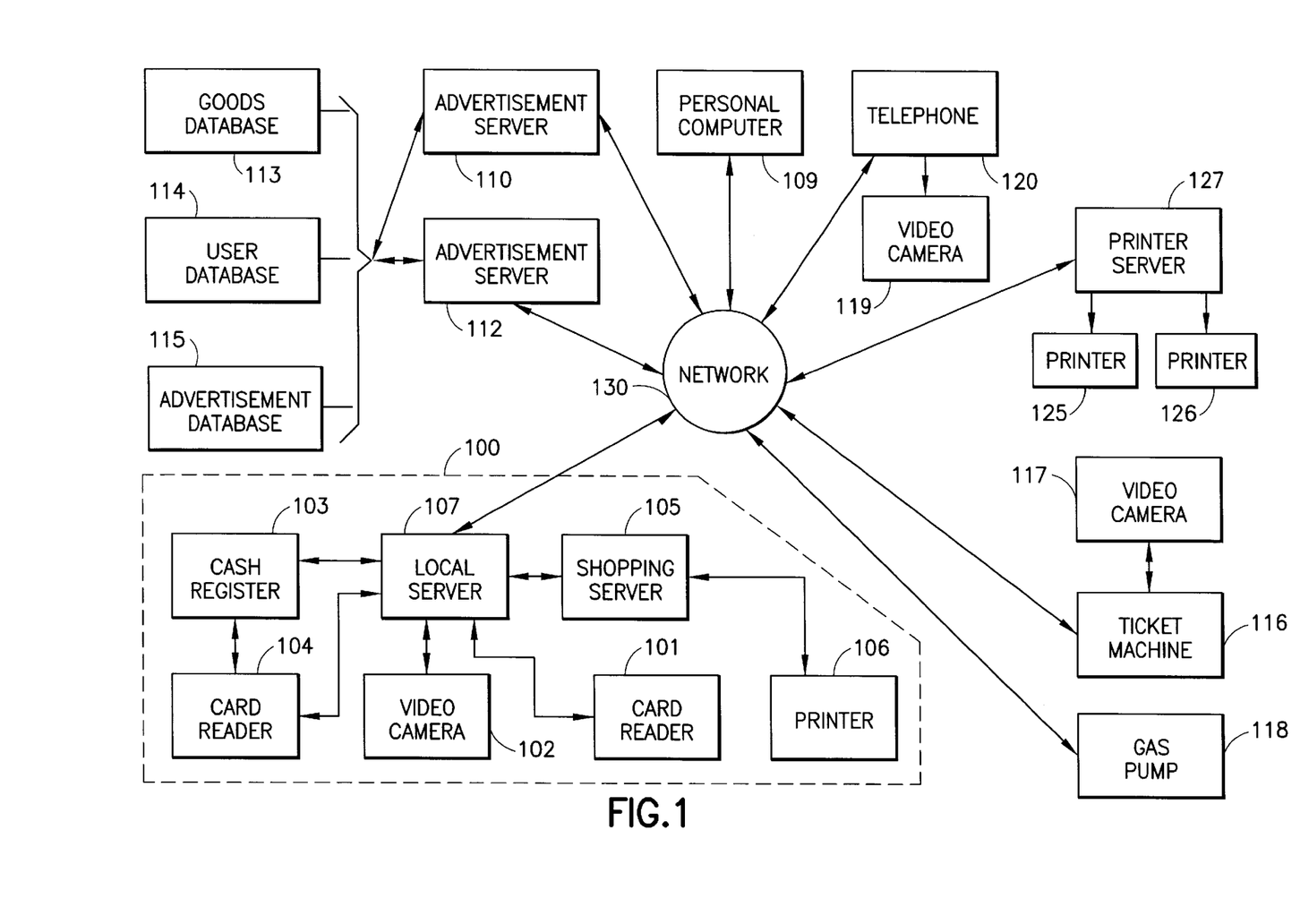
FIG. 1 is a pictorial and block diagram of a distributed personalized advertisement system that embodies the present invention.

With reference to the Figures, there is illustrated a system, method and memory media according to the present invention for providing an advertisement that is personalized to a particular user. Referring particularly to FIG. 1, the system includes several types of transaction terminals that use printing devices. One type of terminal includes receipt producing devices that are used in sale services, namely a cash register 103, a card reader 101, a card reader 104, a gas pump 118 and a ticket sale machine 116.

Another type of transaction terminal is a printer server 127 that controls printers 125 and 126. For example, printer server 127 may include an information bureau. Printers 125 and 126 are supported by printer server 127.

Another example of a local server is local server 107 shown in a shopping center local network system 100. Local server 107 is connected with the following clients: card readers 101 and 104, cash register 103 and a video camera 102. Local server 107 is connected to another shopping server 105 that is connected to a printer 106.

Local network system 100 is connected to an advertisement server 110 or an advertisement server 112, via a network 130 that may, for example, be the Internet. Advertisement servers 110 and 112 have access to a database means shown as a goods/services database 113, a user database 114 and an advertisement database 115. For the purposes of description herein, advertising server 112 is assumed to be used by the personalized advertising system. Goods/services database 113 contains data concerning goods and services that are generally available on the market. User database 114 contains, for each of a plurality of users, a history of prior transactions. Advertisement database 115 contains a plurality of advertisements. Databases 113, 114 and 115 may all be stored in one memory device or in separate memory devices.

When a customer presents goods/services for purchase to a cashier who controls cash register 103, the cashier enters in cash register 103 data about the goods/services and their prices. After the cost of these goods is displayed to the customer, his/her shopping or charge card is read by card reader 104. The information contained on the card includes charge account information as well as the customer identity. The customer's identity, goods/services being purchased and their prices (current transaction data) are communicated to local server 107 which relays the current transaction data to advertisement server 112 via network 130.

Advertisement server 112 uses the current transaction data to produce one or more advertisements that take into account the current transaction or prior transactions of the particular customer. For example, if medicine for treating headache is being purchased, the personalized advertisement might contain a description of a new medicine for headache treatment. Advertisement server 112 also has access, via user database 114, to goods/services that the particular customer has bought in the past. For example, if a prior transaction involved the purchase of a book written by a certain author, the personalized advertisement may include a new book written by the same author. These personalized advertisements are printed on the sales receipt for the current transaction that is produced by cash register 103.

Video camera 102 is arranged to send an image of the customer to the advertisement server 112 (via local server 107). The image data can be used for producing an advertisement related to the customer's physical appearance. For example, if the image data shows a woman with red hair, the advertisement can contain a description of shampoo for red hair. Card reader 104 does not have a printer as it is associated with cash register 103 that has a printer. Card reader 104 together with cash register 103 form a transaction terminal. However, other card readers, such as card reader 101, may be equipped with a printer to form a transaction terminal. A typical use for card reader 101 is to verify charge cards and to print transactional receipts, upon which can be printed a personalized advertisement. The method for using card reader 101 for personalized advertisements is similar to the above described method for producing a personalized advertisement for cash register 103.

Shopping server 105 contains information about all goods/services that are available in the shopping center in which system 100 is installed. A customer using shopping server 105 can search for goods/services that are displayed on a terminal of shopping server 105. Shopping server 105 may also operate printer 106 to print goods/services that were found by a search. The current transaction data of the search inquiry can be packaged with the customer identity and communicated via local server 107 to advertiser server 112 for a personalized advertisement that can be displayed at shopping server 105 and/or printed by printer 106 with the search results. For example, if a customer selected on shopping server 105 a low fat food, the personalized advertisement can be related to low fat food.

The task of local server 107 is to support printers and other devices connected in local area system 100 and communicate with advertisement server 112. Server 107 may contain a small database about customers who often attend the shopping center where system 100 is installed. This database can be used by the advertisement server 112 similarly as it uses user database 114.

Another sales system with embedded printers shown in FIG. 1 is gas pump 118. Typically, gas pump 118 contains a card reader and printer so as to obtain the customer's identity and charge account data as well as to print a receipt. The current transaction data (customer identity, goods/services and price) is communicated to advertiser server 112 via network 130. Advertising server 112 responds to send to gas pump 118 an advertisement based on information concerning the particular customer that is stored in database 114.

Ticket sale machine 116 is associated with a video camera 117 that captures an image of the physical appearance of a particular customer who is purchasing a ticket. This image data can be packaged with the current transaction data and communicated to advertising server 112 for a personalized advertisement that can be printed on an unused space of the ticket.

Printer server 127 may include an information bureau. If a particular user provides his/her identity when requesting information, a personalized advertisement can be sent to via a printer 125 or 126 in the manner described above for shopping center local network system 100. If an identity is not so provided, a video camera (not shown) can be used to provide physical appearance data about a particular user as described for video cameras 102 and 117.

Printer server 127 can alternatively be used in a network environment where several users share printers 126 and 125. Since the identity of a particular user is usually known to printer server 127, say printer 125, this computer system can send the particular user identity to advertising server 112. Advertising server 112 can send an advertisement personalized to the particular user for printing on documents at printer 125 for the particular user. For this application user database 114 is equipped with user characteristics for persons who have access to printer 125. For example, the advertisement could be printed on one side of a first page that usually contains only the identity of the particular user and a name of a file that is printed on the next set of pages.

A different kind of advertisement presentation can be done for devices that have displays, like PC 109 and telephone 120. PC 109 may be equipped with a home shopping software that enables a particular user to obtain a personalized advertisement to be displayed on the PC screen (not shown). Telephone 120 may be a smart telephone with a built in display and/or may be associated with a video camera 119 as it was described for shopping server 105 or ticket sale machine 116 and it associated video camera 117.

Other ways to establish user identity include sensing voice and/or biometrics. Voice, for example, can distinguish females from males and adults from children. Biometrics include voice, fingerprints and the like. There is growing area in which customers are required to provide their identity via biometrics for access to services. This type of identification can be also used for providing personalized advertisement (as described with card readers).

Figure 2:
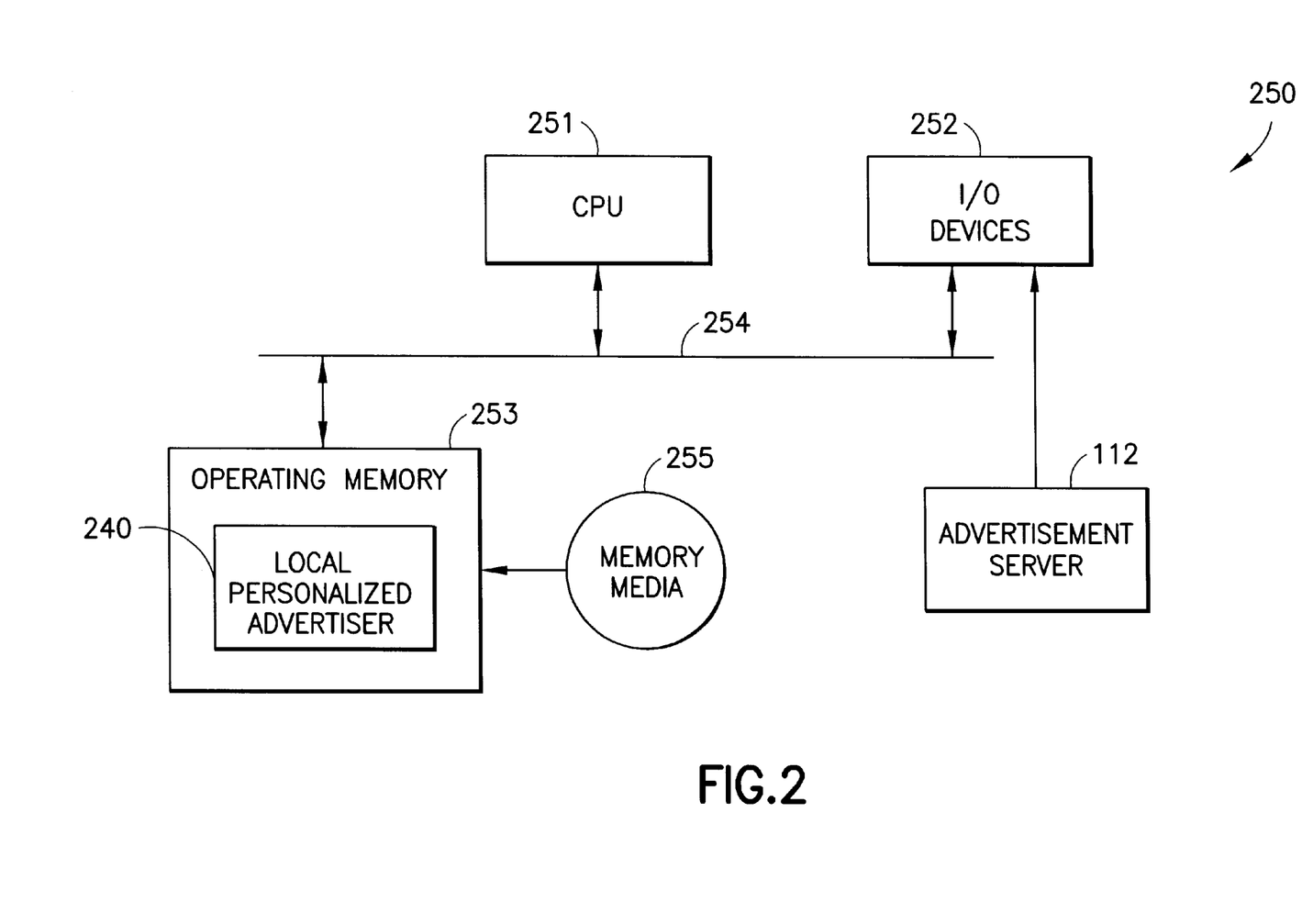
FIG. 2 is a block diagram of a local server for the FIG. 1 system.

Referring now to FIG. 2, a local server 250 is shown as representative of the computer system that is embodied in servers 105, 107, 127 as well as in gas pump 118, ticket sale machine 116, telephone 120 and PC 109. Local server 250 includes a central processing unit (CPU) 251, I/O (I/O) devices 252 and operating memory 253 interconnected via a bus 254. Stored in operating memory 253 is a local personalized advertiser 240. Local personalized advertiser 240 may be provided by a memory device, such as memory media 255. Local personalized advertiser 240 configures CPU 251 to perform the personalized advertising process as described below.

I/O devices 252 include the various I/O devices shown in FIG. 1. For example, for local server 107 the I/O devices include cash register 103, card readers 101 and 104, and video camera 102. Alternatively, I/O devices 252 can communicate with cash register 103, card readers 101 and 104, and video camera 102 in other ways as, for example, via a network wire or phone line in shopping center local area system 100 of FIG. 1. For the case of gas pump 118, the I/O devices include a card reader and/or keypad and a sales receipt printer. For the case of ticket sale machine 116, the I/O devices include video camera 117, a keypad and a ticket printer. For the case of PC 109, the I/O devices 252 include a keyboard, mouse, microphone, display, printer and the like. For the case of telephone 120, the I/O devices 252 include video camera 119, a keypad and optionally a voice response device.

I/O devices 252 also include a transceiver for sending personalized advertising requests to and receiving personalized advertisements from advertising server 112.

Figure 3:
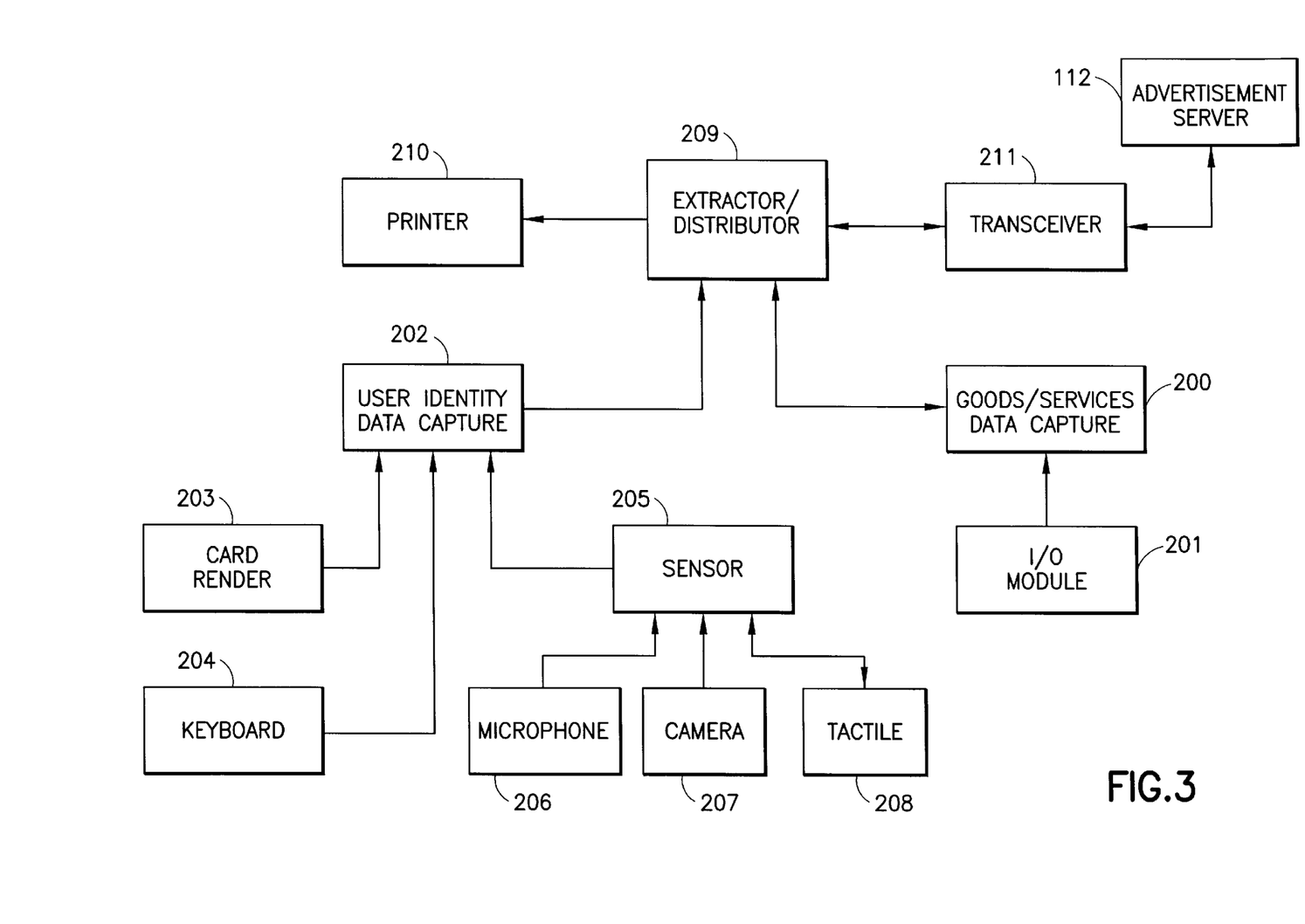
FIG. 3 is a functional block diagram of a local service provider of a local personalized advertiser contained in the FIG. 2 local server.

Referring to FIG. 3, local personalized advertiser 240 includes an I/O module 201 that receives current transaction data for goods/services and prices chosen by the customer from the various input devices shown in FIG. 1. This current transaction data is then captured in a module 200.

Local personalized advertiser 240 also includes a user identity data capture module 202 that obtains user identity data from one or more of various modules, shown as a card reader 203, keyboard 204 and a sensor 205. Card reader module 203 receives user identity data from a card reader, such as card readers 101 or 104 of FIG. 1. Keyboard module 204 receives user identity data from a device having a keyboard, such as cash register 103, gas pump 118, ticket sale machine 116, telephone 120 or PC 109. Sensor module 205 receives user identity data from biometric input devices shown in FIG. 3 as microphone 206, camera 207 and tactile 208 (for finger prints).

Current transaction data captured by modules 200 and 202 is processed by an extractor/distributor module 209. Module 209 divides the current transaction data into various parts for distribution via different channels for use by module 200 or module 202, for printing to a printer module 210 and to advertisement server (112).

An example of current transaction data that module 209 sends to module 200 is data concerning goods that were selected by a customer. For example, using video camera 207, pictures of goods that a customer selected are sent to module 200 where titles and prices of these goods are captured and sent to module 209 for further distribution. Examples of information that is sent to printer module 210 include sales receipt data and advertisements. Examples of information that is sent to advertisement server 112 are customer identity, customer biometrics, goods and prices chosen by the customer. Communication with outside servers are done through a transceiver module 211 that contains a communication port and other communication means.

A method embodiment according to the present invention obtains from advertisement server 112 an advertisement that is personalized to a particular user for a current transaction. The method uses the FIG. 2 computer system that includes CPU 251, operating memory 253 and I/O devices 252. The method includes the steps of:

receiving, via I/O devices 252, data concerning the current transaction for the particular user;

extracting from the current transaction data, with the aid of CPU 251, advertisement request data;

operating I/O devices 252 to send the advertisement request data to advertisement server 112 and to receive from advertisement server 112 the personalized advertisement; and operating I/O devices 252 to communicate the personalized advertisement to the particular user.

The identity data includes one or more characteristics selected from the group of name, physical characteristics, age, gender, and biometrics. The personalized advertisement procedure distributes the personalized advertisement to the I/O devices for communication to the particular user.

The personalized advertisement is presented to the particular user on a sales receipt or on a display.

A memory media embodiment according to the present invention controls the FIG. 2 computer system to obtain from advertisement server 112 an advertisement that is personalized to a particular user for a current transaction. The memory media includes:

means for configuring the computer system to receive data concerning the current transaction for the particular user;

means for configuring the computer system to extract from the current transaction data an advertisement request data;

means for configuring the computer system to send the advertisement request data to the advertisement server and to receive from the advertisement server the personalized advertisement; and means for configuring the computer system to communicate the personalized advertisement to the particular user.

The identity data includes one or more characteristics selected from the group of name, physical characteristics, age, gender, and biometrics. The personalized advertisement is distributed for communication to the particular user on a sales receipt or on a display.

Figure 4:
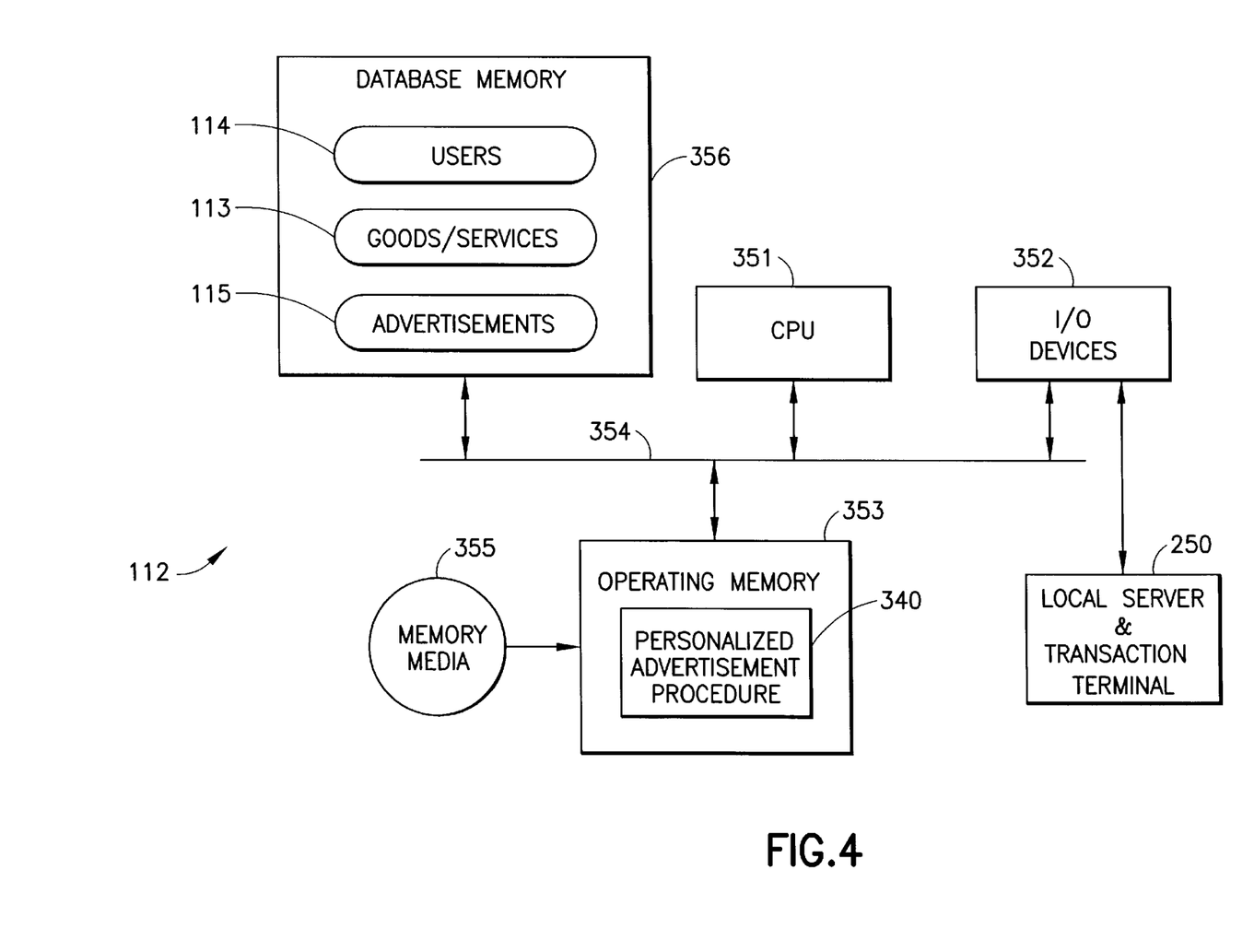
FIG. 4 is a block diagram of an advertisement server for the FIG. 1 system.

Referring to FIG. 4, advertisement server 112 includes a central processing unit (CPU) 351, I/O devices 352 and an operating memory 353 interconnected via a bus 354. Stored in operating memory 353 is a local personalized advertiser procedure 340. Local personalized advertiser procedure 340 may be provided by a memory device, such as memory media 355. Also connected to bus 354 is a database means 356 that includes user database 114, goods/services database 113 and advertisement database 115. Local personalized advertiser procedure 340 configures CPU 351 to perform the personalized advertising server process as described below.

I/O devices 352 includes the appropriate communication devices for sending and receiving data via network 130 to local servers, such as local server 250.

Figure 5:
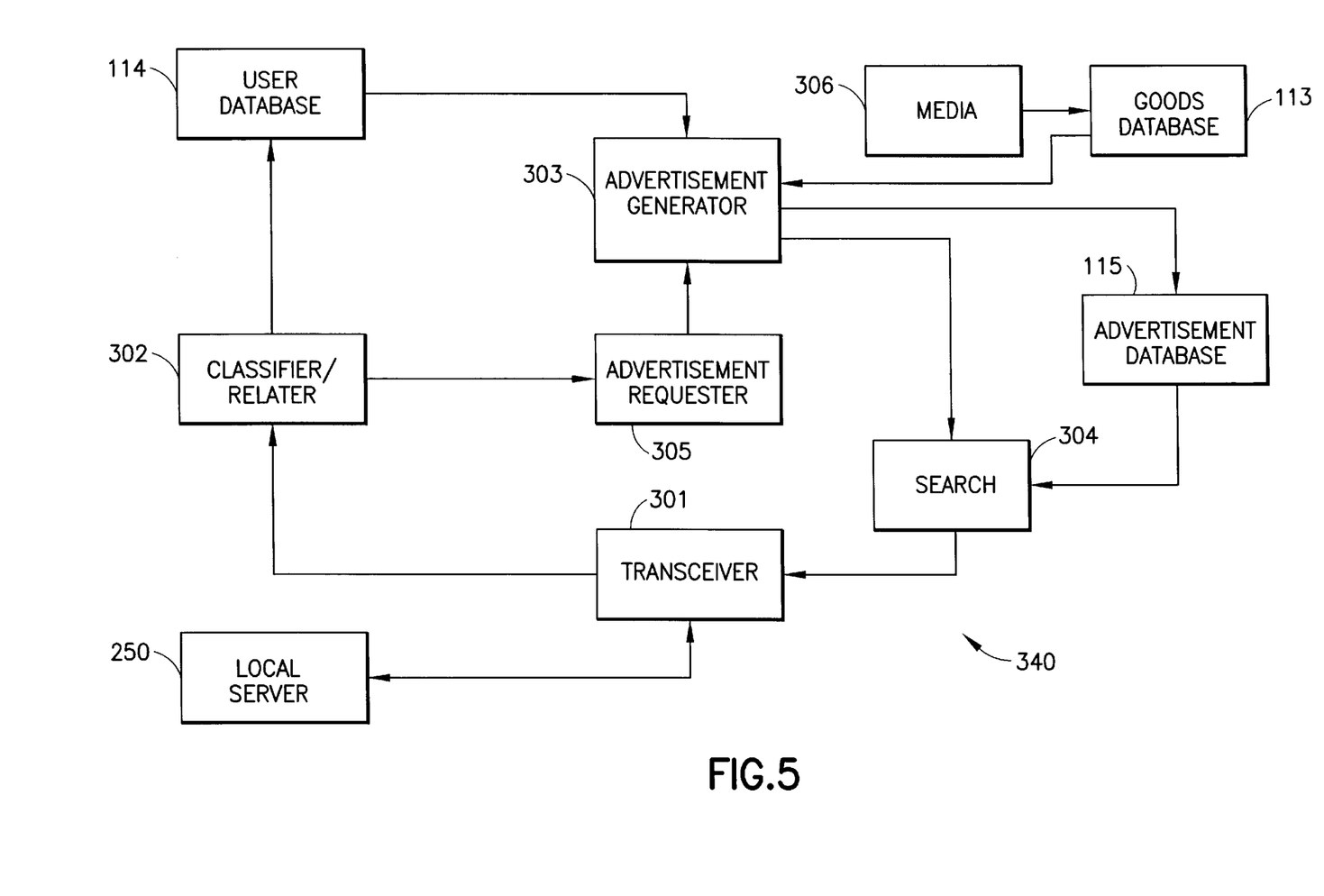
FIG. 5 is a functional block diagram of a personalized advertisement procedure contained in the FIG. 4 advertisement server.

Referring to FIG. 5, personalized advertisement procedure 340 includes a transceiver module 301 for receiving from local server 250 current transaction data and for sending to local server 250 a personalized advertisement. Transceiver module 301 sends the current transaction data to a classifier/relater module 302. Classifier/relater module 302 classifies the current transaction data according to one or more criteria selected from the group of age, gender, citizenship and physical characteristics of the particular user. For example, customers are classified as old, young, male, female, citizenship, hair color, height, weight, and the like. Goods/services being purchased are classified by type, such as medicine, clothing, appliances, tools, price and the like.

Classifier/relater module 302 relates different pieces of data. For example, classifier/relater module 302 relates classes of customers to classes of goods. The relationship between classes of different goods/services can be represented as a table with entries in intersections of columns and rows that count how often corresponding pairs of classes occur. The information produced by module 302 is stored in user database 114. User database 114 contains customer names, customer classes, history of customer activity (for example, what the customer has bought and when).

Classifier/relater module 302 sends the current transaction data to an advertisement requester module 305. Advertisement requester module 305 is operable to request an advertisement for the particular customer. Advertisement requester 305 specifies a form for the requested advertisement that depends on many factors that include where and how the advertisement will be shown to a customer, for example, front or back of a sales receipt or a ticket, on a first title page produced by an ordinary printer, on a small display of a smart phone or on a screen of a PC.

A special request for some kind of advertisements can be also included in a message that is sent from local server 250. For instance, local server 250 may limit the advertisement to certain brands. Advertisement requester module 305 sends an advertisement request for the current transaction to an advertisement generator module 303. Advertisement generator module 303 uses user database 114, goods/services database 113 and advertisement database 115 to produce an advertisement that is personalized to the particular user and fits a format requested by advertisement requester module 305. A search module 304 searches for existing advertisements in advertisement database 115 using the current transaction data. If a suitable advertisement is found, it is sent to local server 250 by transceiver module 301.

Advertisement generator 303 can also create a new advertisement for storage in advertisement database 115 and/or communication to the particular user. The new advertisement can be based on goods or services contained in goods/services database 113. Goods/services database 113 is updated with information about new goods/services obtained from a media module 306 that contain all forms of media for selecting information about goods/services (Internet, TV, newspapers and the like). Advertisement generator 303 can also send current transaction data to advertising creators for manually or automatically generating new advertisements.

In accordance with a method embodiment of the present invention, an advertisement that is personalized to a particular user for a current transaction, includes the steps of storing in database 356 data concerning a plurality of (a) users, (b) goods or services and (c) advertisements for various ones or categories of said goods or services;

receiving, via I/O devices 352, data concerning a current transaction for the particular user;

processing the current transaction data with processor 351;

altering the user data in the database with the current transaction data;

generating the advertisement personalized to the particular user; and operating I/O devices 352 to communicate the personalized advertisement to the particular user.

The processing step classifies the current transaction data as to categories of goods/services to produce classification data and by relation to prior transactions by the particular user to produce relation data. The classification and relation data is used to alter the user data. The personalized advertisement is generated based on the prior transactions or the current transaction by either selecting an advertisement from the advertisements contained in the database or by creating a new advertisement with use of the goods/services data. The current transaction data includes for the particular user an identity, goods/services and prices chosen by the particular user and optionally the biometrics of said particular user. The classification is according to criteria selected from the group that includes age, gender, area of residence, citizenship and physical characteristics of the particular user and type and price of goods/services involved in the current transaction. The relation data is according to a relation between classes of customers and categories of goods/services.

A memory media embodiment in accordance with the present invention has stored thereon personalized advertisement procedure 340 for configuring the computer system shown in FIG. 4 to receive, via I/O devices 352, data concerning the current transaction for the particular user. The personalized advertiser also configures the computer to process the current transaction data with processor 351, to alter the user data in the database with the current transaction data, to generate the advertisement personalized to the particular user and to operate the I/O devices to communicate the personalized advertisement to the particular user.

The processing operation classifies the current transaction data as to categories of goods/services to produce classification data and by relation to prior transactions by the particular user to produce relation data. The user data is altered by the classification and relation data. The personalized advertisement is generated based on the prior transactions or the current transaction for the particular user by either selecting an advertisement from the advertisements contained in the database or by creating a new advertisement with use of the goods/services data. The current transaction data includes for the particular user an identity, goods/services and prices chosen by the particular user and optionally biometrics of the particular user.

The present invention having been thus described with particular reference to the preferred forms thereof, it will be obvious that various changes and modifications may be made therein without departing from the spirit and scope of the present invention as defined in the appended claims.

What is claimed is:

1. A system for providing an advertisement personalized to a particular user for a current transaction, said system comprising:
   a processor, an operating memory and one or more input/output devices;
   a database for containing (a) user data concerning prior transactions of a plurality of users including said particular user, (b) data concerning goods or services and (c) a plurality of advertisements for various ones or categories of said goods or services;
   means including said input/output devices for receiving current transaction data concerning said current transaction for said particular user; and
   a personalized advertisement procedure stored in said operating memory and operative to configure said processor to (a) process said current transaction data, (b) alter said user data in said database that concerns the prior transactions of said particular user with said current transaction data, (c) generate said advertisement personalized to said particular user and (d) to communicate said personalized advertisement to said particular user.

2. The system according to claim 1, wherein said user data contains a history of goods/services transactions for each user of said plurality of users;
   wherein said current transaction data is processed by classification as to categories of goods/services to produce classification data and by relation to prior transactions by said particular user to produce relation data;
   wherein said user data is altered by said classification data and said relation data; and
   wherein said personalized advertisement is generated for said particular user based on said prior transactions or said current transaction by either selecting an advertisement from said advertisements contained in said database means or by creating a new advertisement through use of said goods/services data.

3. The system according to claim 2, wherein said current transaction data for said particular user includes an identity and goods/services and prices chosen by said particular user.

4. The system according to claim 3, wherein said current transaction data includes biometrics of said particular user.

5. The system according to claim 2, wherein said classification is according to criteria selected from the group that includes age, gender, area of residence, citizenship and physical characteristics of said particular user and type and price of goods/services involved in said current transaction.

6. The system according to claim 5, wherein said relation data is according to a relation between classes of customers and categories of goods/services.

7. The system according to claim 2, wherein the type and/or format of said personalized advertisement is qualified by type and/or format data contained in said current transaction data.

8. A method for providing an advertisement that is personalized to a particular user for a current transaction, said system including a processor, an operating memory and one or more input/output devices, said method comprising:
   storing in a database (a) user data concerning prior transactions of a plurality of users including said particular user, (b) data concerning goods or services and (c) a plurality of advertisements for various ones or categories of said goods or services;
   receiving, via said input/output devices, current transaction data concerning said current transaction for said particular user;
   altering said user data in said database that concerns the prior transactions of said particular user with said current transaction data;
   generating said advertisement personalized to said particular user; and
   communicating said personalized advertisement to said particular user.

9. The method according to claim 8 comprising the further steps of:
   classifying said current transaction data as to categories of goods/services to produce classification data and by relation to prior transactions by said particular user to produce relation data; and
   wherein said user data is altered by said classification data and said relation data.

10. The method according to claim 9 wherein said personalized advertisement is generated based on said prior transactions or said current transaction for said particular user by either selecting an advertisement from said advertisements contained in said database means or by creating a new advertisement with use of said goods/services data.

11. The method according to claim 10 wherein said current transaction data includes for said particular user, an identity, goods/services and prices chosen by said particular user.

12. The method according to claim 11, wherein said current transaction data includes biometrics of said particular user.

13. The method according to claim 11, wherein said classification is according to criteria selected from the group that includes age, gender, area of residence, citizenship and physical characteristics of said particular user and type and price of goods/services involved in said current transaction.

14. The method according to claim 13, wherein said relation data is according to a relation between classes of customers and categories of goods/services.

15. A memory media for controlling a computer system to produce an advertisement that is personalized to a particular user for a current transaction, said computer being operable with a database containing (a) user data concerning prior transactions of a plurality of users including said particular user, (b) data concerning goods or services and (c) a plurality of advertisements for various ones or categories of said goods or services; said memory media comprising:
   means for configuring said computer system to receive current transaction data concerning said current transaction for said particular user;
   means for configuring said computer system to alter said user data in said database that concerns the prior transactions of said particular user with said current transaction data;
   means for configuring said computer system to generate said advertisement personalized to said particular user in accord with said user data; and
   means for configuring said computer system to communicate said personalized advertisement to said particular user.

16. The memory media according to claim 15, wherein said computer system is controlled to classify said current transaction data as to categories of goods/services to produce classification data and by relation to prior transactions by said particular user to produce relation data; and
   wherein said user data is altered by said classification data and said relation data.

17. The memory media according to claim 16 wherein said computer system is controlled to generate said personalized advertisement based on said prior transactions or said current transaction for said particular user by either selecting an advertisement from said advertisements contained in said database means or by creating a new advertisement with use of said goods/services data.

18. The memory media according to claim 17 wherein said current transaction data includes for said particular user an identity, goods/services and prices chosen by said particular user.

19. The memory media according to claim 18, wherein said current transaction data includes biometrics of said particular user.

20. A system for obtaining from an advertisement server an advertisement that is personalized to a particular user for a current transaction, said system comprising:

a processor, an operating memory and one or more input/output devices;

means including said input/output devices for receiving data concerning said current transaction for said particular user; and a personalized advertisement procedure stored in said operating memory and operative to configure said processor to (a) extract from said current transaction data advertising request data that includes the identity of said particular user, the goods/services and prices chosen by said particular user and (b) operate said input/output devices to communicate said advertisement request data to said advertisement server.

21. The system according to claim 20, wherein said identity data includes one or more characteristics selected from the group of name, physical characteristics, age, gender, and biometrics.

22. The system according to claim 21, further comprising means including said input/output devices for receiving said advertisement personalized to sad particular user from said advertisement server according to said advertising request, and wherein said personalized advertisement procedure distributes said personalized advertisement to said input/output devices for communication to said particular user.

23. The system according to claim 21, wherein said personalized advertisement is printed on a sales receipt.

24. The system according to claim 21, wherein said personalized advertisement is displayed.

25. A method for obtaining from an advertisement server an advertisement that is personalized to a particular user for a current transaction, said method using a computer that includes one or more input/output devices, said method comprising:

receiving from a client device, via said input/output devices of said computer, data concerning said current transaction for said particular user;

operating said computer to extract advertisement request data from said current transaction data;

operating said input/output devices of said computer to send said advertisement request data to said advertisement server and to receive from said advertisement server said personalized advertisement; and operating said input/output devices of said computer to send said personalized advertisement to said client device for communication to said particular user.

26. The method according to claim 25, wherein said identity data includes one or more characteristics selected from the group of name, physical characteristics, age, gender, and biometrics.

27. The method according to claim 26, wherein said personalized advertisement server distributes said personalized advertisement to said input/output devices for communication to said particular user.

28. The method according to claim 26, wherein said personalized advertisement is printed on a sales receipt.

29. The method according to claim 26, wherein said personalized advertisement is displayed.

30. A memory media for controlling a computer to obtain from an advertisement server an advertisement that is personalized to a particular user for a current transaction, said computer being configured to obtain said personalized advertisement, said memory media comprising:

means for configuring said computer to receive from a client device data concerning said current transaction for said particular user;

means for configuring said computer to extract advertisement request data from said current transaction data;

means for configuring said computer system to send said advertisement request data to said advertisement server and to receive from said advertisement server said personalized advertisement; and means for configuring said computer system to send said personalized advertisement to said client device for communication to said particular user.

31. The memory media according to claim 30, wherein said identity data includes one or more characteristics selected from the group of name, physical characteristics, age, gender, and biometrics.

32. The memory media according to claim 31, wherein said personalized advertisement is distributed for communication to said particular user.

33. The memory media according to claim 31, wherein said personalized advertisement is printed on a sales receipt.

34. The memory media according to claim 31, wherein said personalized advertisement is displayed.

35. The method according to claim 26, wherein said personalized advertisement is printed on a page that accompanies a document also being printed.

* * * * *